(12) United States Patent
Nakamura

(10) Patent No.: US 8,656,703 B2
(45) Date of Patent: Feb. 25, 2014

(54) EXHAUST PURIFICATION DEVICE FOR ENGINE

(75) Inventor: Mikio Nakamura, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 126 days.

(21) Appl. No.: 13/283,117

(22) Filed: Oct. 27, 2011

(65) Prior Publication Data

US 2012/0036842 A1    Feb. 16, 2012

Related U.S. Application Data

(63) Continuation of application No. PCT/JP2009/058419, filed on Apr. 28, 2009.

(51) Int. Cl.
*F01N 3/00* (2006.01)
(52) U.S. Cl.
USPC .................. 60/285; 60/274; 60/295; 60/299
(58) Field of Classification Search
USPC .................................. 60/274–324
See application file for complete search history.

(56) References Cited

U.S. PATENT DOCUMENTS

| 5,609,026 | A  | * | 3/1997  | Berriman et al. ............. 60/286 |
| 7,150,262 | B2 | * | 12/2006 | Demura et al. ............ 123/305 |
| 7,954,311 | B2 | * | 6/2011  | Shaikh et al. ................. 60/266 |
| 2007/0137181 | A1 | * | 6/2007  | Upadhyay et al. ............ 60/286 |
| 2010/0101218 | A1 | * | 4/2010  | Gabe et al. .................... 60/286 |
| 2011/0259290 | A1 | * | 10/2011 | Michikawauchi et al. ... 123/1 A |

FOREIGN PATENT DOCUMENTS

| JP | 55104513 A  | * | 8/1980  |
| JP | A-55-104513 |   | 8/1980  |
| JP | A-61-019940 |   | 1/1986  |
| JP | A-2001-525902 |   | 12/2001 |
| JP | 2006029147 A | * | 2/2006 |
| JP | A-2006-029147 |   | 2/2006 |
| JP | A-2006-220083 |   | 8/2006 |
| JP | A-2009-007948 |   | 1/2009 |
| WO | WO 98/52679 A1 |   | 11/1998 |

* cited by examiner

*Primary Examiner* — Jesse Bogue
(74) *Attorney, Agent, or Firm* — Oliff PLC

(57) ABSTRACT

The present invention provides an exhaust purification device for an engine, comprising: an ammonia supply system including an ammonia supply injector for supplying ammonia to a combustion chamber and a control unit for controlling the ammonia supply injector, and a NOx purification system provided in an exhaust passage and including a Selective Catalytic Reduction catalyst being able to fulfill a function for purifying NOx under the presence of the ammonia.

15 Claims, 6 Drawing Sheets

EXHAUST PURIFICATION DEVICE FOR ENGINE

CROSS-REFERENCE TO RELATED APPLICATIONS

This application is a continuation application of International Application No. PCT/P2009/058419 filed Apr. 28, 2009 which is hereby incorporated by reference herein in its entirety.

BACKGROUND OF THE INVENTION

1. Field of the Invention

This invention relates to en exhaust purification device for an engine and, more particularly, to an exhaust purification device for an engine provided with a Selective Catalytic Reduction catalyst having a function for purifying NOx.

2. Description of the Related Art

As an exhaust purification device arranged in the exhaust system of en engine such as a diesel engine or the like, there is generally known an exhaust purification device including a NOx catalyst for purifying nitrogen oxides (NOx) included in the exhausted gases. As the Nox catalyst, there is well known a catalyst that selectively reduces and removes NOx by addition of a reducing agent (SCR (Selective Catalytic Reduction) catalyst). Ammonia is known as the reducing agent. In general, aqueous urea (Urea Solution) is injected into an exhaust passage upstream of an exhaust passage section in which the catalyst is arranged. Ammonia is produced from the aqueous urea by receiving heat from the exhaust gas or the catalyst. Then, the NOx is reduced on the catalyst by the ammonia. Such a NOx purification system intended for NOx purification can be called a SCR catalyst system.

On the other hand, Japanese Patent Laid-Open No. 2001-525902 discloses a device in which a module including a gas discharge section and a module including a catalyst section are lined up in order in the direction of the flow of the exhaust gas to treat the exhaust gas. According to an embodiment in Japanese Patent Laid-Open No. 2001-525902, the module including the catalyst section includes a SCR catalyst, and a reducing agent is added to the modulo.

Since the device disclosed in Japanese Patent Laid-Open No. 2001-525902 is provided with the module including the gas discharge section, it requires a discharge device including a battery for use in electrical discharge or a power generator. Therefore, the device has a significant problem regarding energy consumption in a vehicle, and also has a need of taking measures to address an increase in cost associated with this.

Therefore, the present invention has been made in view of the above circumstances and it is an object of the invention to provide a technique of appropriately treating NOx in the exhaust gas without the need for much energy.

SUMMARY OF THE INVENTION

To attain this object, the present invention provides an exhaust purification device for an engine comprising an ammonia supply system including an ammonia supply injector for supplying ammonia to a combustion chamber and a control unit for controlling the ammonia supply injector, and a NOx purification system for purifying NOx included in an exhaust gas.

Preferably, the NOx purification system includes a Selective Catalytic Reduction catalyst fulfilling a function for purifying NOx under the presence of ammonia.

The ammonia supply system preferably injects ammonia from the ammonia supply injector. Specifically, the ammonia supply system and the NOx purification system may share a common tank for storing ammonia, the ammonia supply system may inject the ammonia from the ammonia supply injector and the NOx purification system may supply ammonia to an exhaust passage upstream of an exhaust passage section in which the Selective Catalytic Reduction catalyst is arranged.

Alternatively, the ammonia supply system preferably injects aqueous urea from the ammonia supply injector to supply ammonia to the combustion chamber. Specifically, the ammonia supply system and the NOx purification system may share a common tank for storing aqueous urea, the ammonia supply system may inject the aqueous urea from the ammonia supply injector to supply the ammonia to the combustion chamber and the NOx purification system may supply aqueous urea to the exhaust passage upstream of the exhaust passage section in which the Selective Catalytic Reduction catalyst is arranged.

Preferably, the control unit controls injection from the ammonia supply injector in such a manner that a ratio between a NO component and a $NO_2$ component in the exhaust gas arriving at the exhaust passage section in which the Selective Catalytic Reduction catalyst is arranged is made to 1:1.

The control unit preferably controls the ammonia supply injector to supply the ammonia to the combustion chamber when a temperature in the combustion chamber is a temperature within a first predetermined temperature range. The first predetermined temperature range is preferably a temperature range from 1000K or higher to 1400K or lower. The ammonia supply system preferably comprises temperature detection means for detecting a temperature in the combustion chamber. For example, the temperature detection means comprises a sensor for detecting a pressure in the combustion chamber. Preferably, the control unit controls the ammonia supply injector to supply the ammonia to the combustion chamber when a temperature of the Selective Catalytic Reduction catalyst in a temperature within a second predetermined temperature range. The second predetermined temperature range is preferably a temperature range from 150° C. or higher to 300° C. or lower.

In addition, preferably en exhaust purification device for an engine illustrative of the present invention further comprises at least one of downstream temperature detection means for detecting a temperature in the exhaust passage downstream of the exhaust passage section in which the Selective Catalytic Reduction catalyst is arranged, and NOx detection means for detecting a NOx concentration in the exhaust passage downstream of the exhaust passage section in which the Selective Catalytic Reduction catalyst is arranged, wherein the control unit may control injection from the ammonia supply injector by using least one of the downstream temperature detection means and the NOx detection means.

Preferably, a catalyst including no catalyst component promoting a reaction of nitrogen oxides including NO and $NO_2$ is arranged in the exhaust passage upstream of the exhaust passage section in which the Selective Catalytic Reduction catalyst is arranged.

It should be noted that the present invention also consists in an engine provided with one of the various types of exhaust purification devices for engines as described above.

In addition, the present invention can provide an exhaust purification method for an engine using a NOx purification system including a Selective Catalytic Reduction catalyst, which is provided in an exhaust passage for fulfilling a function for purifying NOx under the presence of ammonia, to purify NOx, the method comprising a step of supplying ammonia to as combustion chamber when a temperature in the combustion chamber is a temperature within a predetermined temperature range.

Further features of the present invention will become apparent from the following description of exemplary embodiments (with reference to the attached drawings).

DESCRIPTION OF THE EMBODIMENTS

Figure 1:
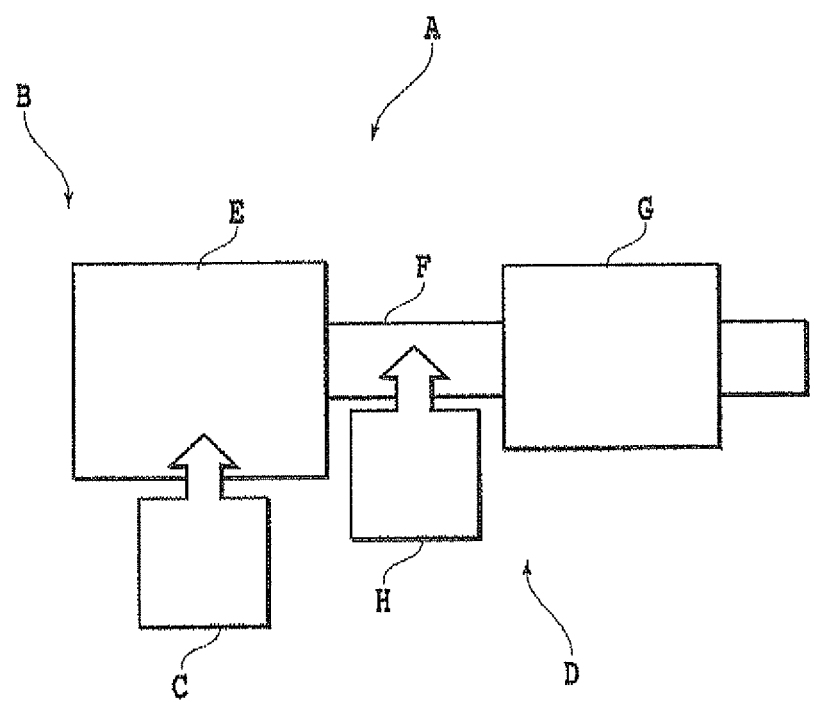
FIG. 1 is a schematic diagram illustrating components of an exhaust purification device for an engine according to the invention.

Basic components of an exhaust purification device A for an engine (an exhaust purification device) according to the present invention will be first described with reference to FIG. 1. The exhaust purification device A is applied to an engine B in FIG. 1. The exhaust purification device A comprises an ammonia supply system C for supplying ammonia into a combustion chamber, and a NOx purification system D for purifying NOx contained in an exhaust gas.

The ammonia supply system C is provided for adjusting a ratio between NO and $NO_2$ in the exhaust gas to a required ratio, and therefore may be called ratio adjusting means. The ammonia supply system C is adapted to inject ammonia itself or a substance producing the ammonia by chemical reaction (for example, aqueous urea) into the combustion chamber, to supply the ammonia into the combustion chamber. Specifically, the ammonia supply system C comprises an ammonia supply injector located to be exposed to the combustion chamber and a control unit for controlling the ammonia supply injector for the purpose of supplying ammonia into a cylinder, that is, the combustion chamber, in a body E of the engine B.

The NOx purification system D comprises a Selective Catalytic Reduction catalyst (SCR catalyst) provided in the exhaust passage and being able to fulfill the function of purifying NOx under the presence of ammonia. Specifically, the NOx purification system D comprises a SCR catalyst converter G having a SCR catalyst disposed in an exhaust passage F extending from the body F, and an exhaust-system ammonia supply system H for supplying ammonia to the SCR catalyst in the SCR catalyst converter G. The exhaust-system ammonia supply system H may have a structure for supplying ammonia itself or for supplying a substance producing the ammonia by chemical reaction (for example, aqueous urea) so as to result in supplying the ammonia. Alternatively, the exhaust-system ammonia supply system H may comprise a catalyst converter adapted to promote a chemical reaction with a hydrocarbon component or the like in the exhaust gas for ammonia production.

Figure 2:
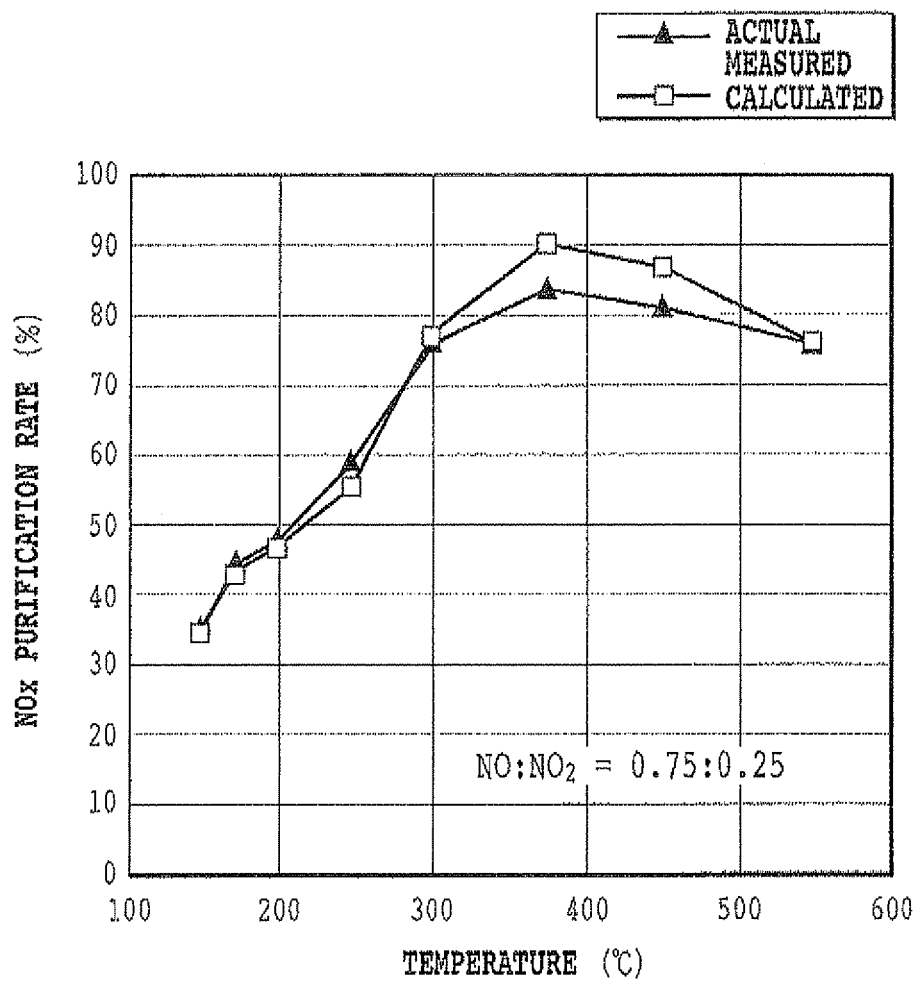
FIG. 2 is a graph showing an example of the NOx purification rate characteristics on a SCR catalyst.
Figure 3:
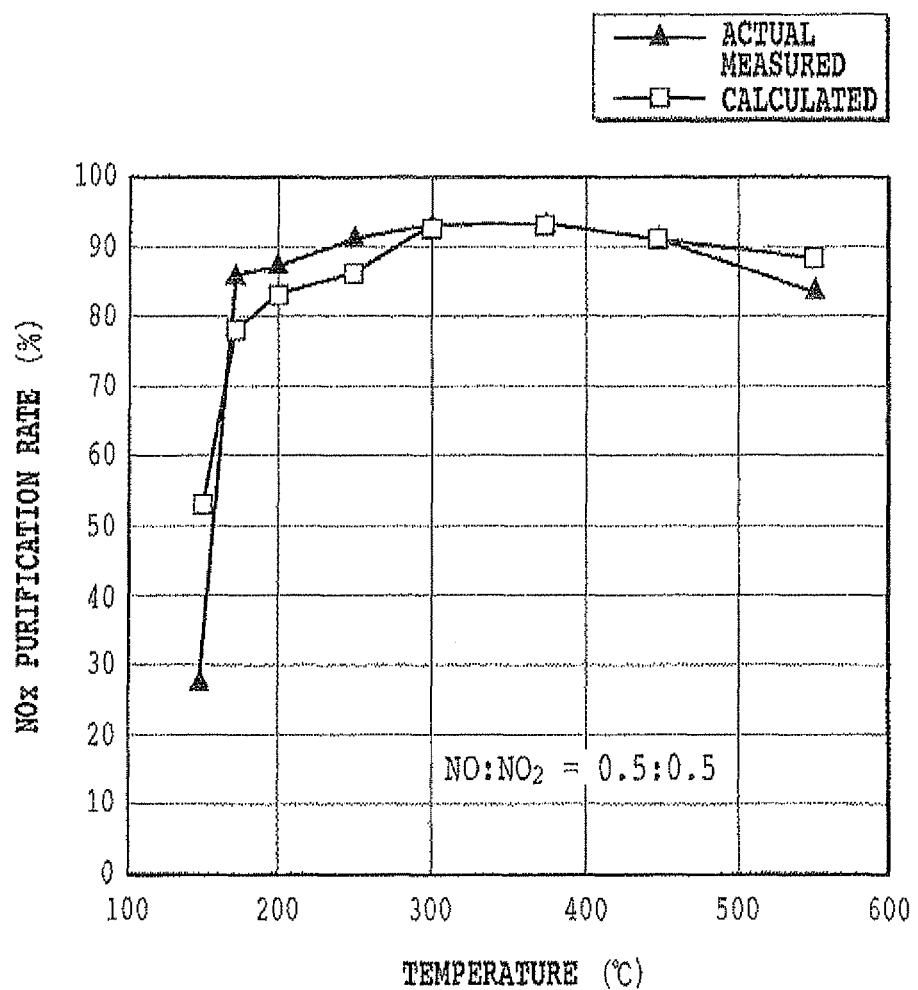
FIG. 3 is a graph showing an example of the NOx purification rate characteristics on a SCR catalyst.

At this stage, the NOx purification rate characteristics with the use of the SCR catalyst shown in FIG. 2 and FIG. 3 will be referred to. FIG. 2 and FIG. 3 show the relationships between the temperatures of the exhaust gas introduced into the SCR catalyst converter disposed in the exhaust passage and the NOx purification rates. In this regard, FIG. 2 shows the experimental results when the ratio between NO and $NO_2$ of the NOx components in the exhaust gas introduced into the SCR catalyst convertor is set at 3:1. Likewise, FIG. 3 shows the experimental results when the ratio between NO and $NO_2$ of the NOx components in the exhaust gas introduced into the SCR catalyst converter is set at 1:1. The "actual measured" value in FIG. 2 and FIG. 3 is a value obtained by the use of experimental facilities, while the "calculated" value is a value obtained from calculations by computer.

It can be seen from FIG. 2 that, when the temperature of the exhaust gas introduced into the SCR catalyst converter is 300° C. or lower, the NOx purification rate is lowered. On the other hand, it can be seen from FIG. 3 that, when the temperature of the exhaust gas introduced into the SCR catalyst converter is between 300° C. or lower and 180° C. or higher, the NOx purification rate is not lowered. From these events, it can be seen that as high NOx purification rate can be more easily achieved in a wide temperature range if the ratio between NO and $NO_2$ in the exhaust gas introduced into the SCR catalyst converter is set to be closer to 1:1. In this regard, it has been seen from experimental results (not show) that a high NOx purification rate can be achieved in a wide temperature range even when the ratio between NO and $NO_2$ is changed from 1:1 to something like 1:2 or 1:3 such that the rate of $NO_2$ is further increased.

On the other hand, it is known that the NO production rates and the $NO_2$ production rates are changed in accordance with the combustion temperatures. Further, it has been found that, if ammonia is present in the combustion environment, the $NO_2$ production is promoted because of the ammonia. For example, in the combustion of fuel-ammonia blended fuel, a $NO_2$ production rate was higher when the combustion temperature ranged from about 1000K (726.85° C.) to about 1400K (1126.85° C.), but a NO production rate was higher when the combustion temperature exceeded 1400K. The production rates changed in accordance with the fuel-to-ammonia ratio.

By correlating these events with each other, it is drawn that, when the temperature of the exhaust gas introduced into the SCR catalyst converter is low, the ammonia is supplied to the combustion chamber to increase the $NO_2$ rate in the exhaust gas, making it possible to increase the NOx purification rate.

As described above, the exhaust purification device A thus has a structure of supplying the ammonia to the combustion chamber to achieve an increase in the rate of purifying NOx in the exhaust gas. Then, in the exhaust purification device A, the supply of the ammonia to the combustion chamber is controlled such that the $NO_2$ rate in the exhaust gas is increased.

An embodiment of the exhaust purification device according to the present invention will be described below in detail.

Figure 4:
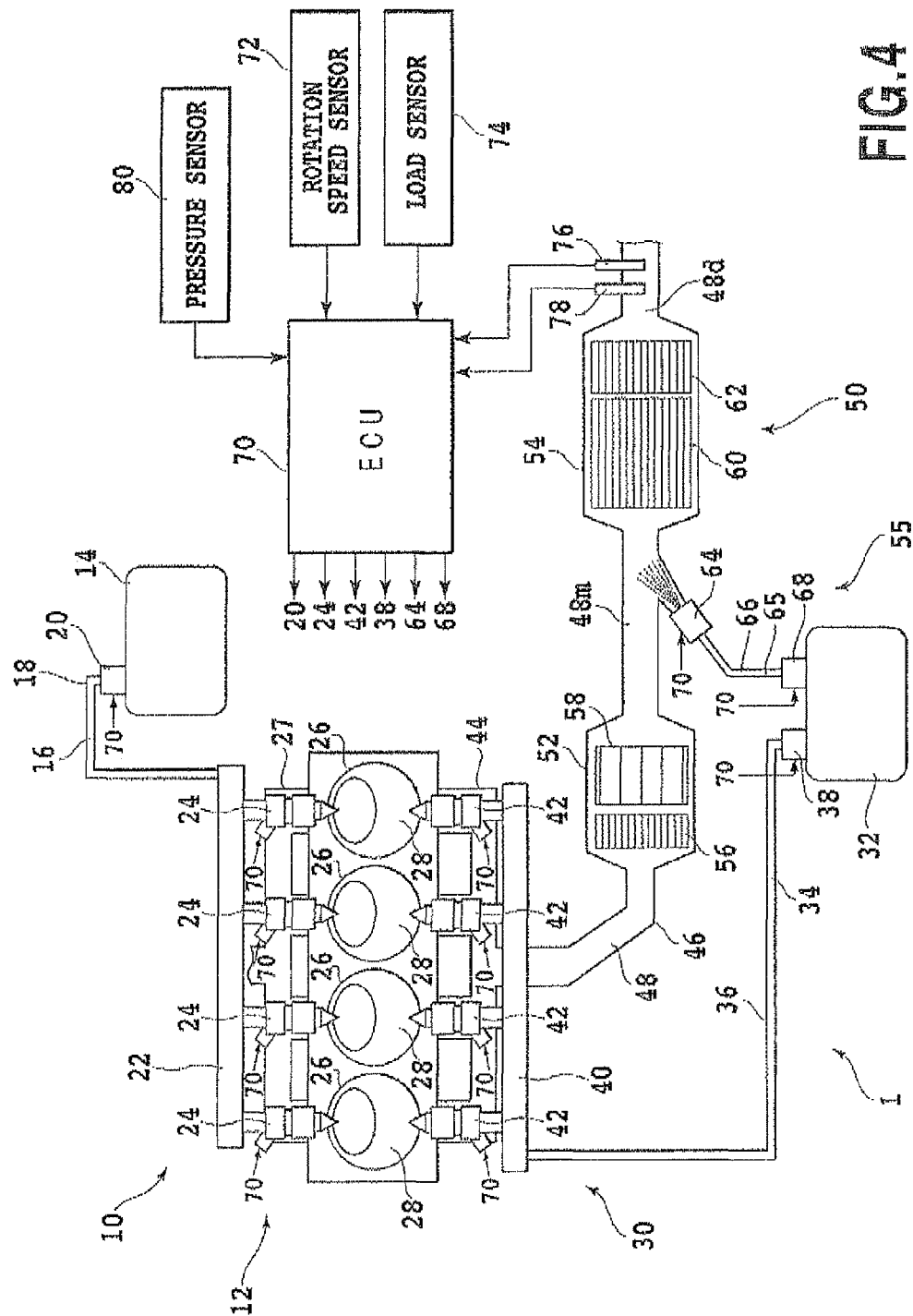
FIG. 4 is a schematic system diagram of an engine to which en exhaust purification device for an engine according to an embodiment is applied.

FIG. 4 is a schematic system diagram of a part of an engine 10 to which an exhaust purification device 1 acccording to an embodiment of the present invention is applied. The engine 10 is a compression ignition engine, that is, a diesel engine, mounted on an automobile. The engine 10 is formed as an in-line four-cylinder engine.

The engine 10 has an in-cylinder injection system, and has a fuel supply system 12 matching this system. The fuel supply system 12 has a fuel tank 14, a first sending tube 18 defining a first sending passage 16, a first pump 20, a first delivery pipe 22 and first injectors 24. Light oil which is the fuel is stored in the fuel tank 14 such that it can be replenished. The fuel in the fuel tank 14 is sent through the first sending passage 16 to the first delivery pipe 22 by the first pump 20. It should be noted that the first injectors 24 are fuel injectors, which are disposed respectively in the cylinders 26 so as to be exposed to the corresponding combustion chambers 28.

Air is sucked into the combustion chambers 28 through an intake system (partially shown) of the engine 10. In the cylinder 26 during the compression stroke, the fuel is injected from the first injector 24 toward a piston cavity in a piston top. FIG. 1 shows an intake manifold 27 alone in the intake system of the engine 10.

Further, an ammonia supply system 30 is provided in the engine 10 for supplying ammonia to the combustion chambers 28. The ammonia supply system 30 is included in the exhaust purification device 1. The ammonia supply system 30 has an aqueous-urea tank 32, a second sending tube 36 defining a second sending passage 34, a second pump 38, a second delivery pipe 40 and second injectors 42. Aqueous urea is stored in the aqueous-urea tank 32 such that it can be replenished. The aqueous urea in the aqueous-urea tank 32 is sent through the second sending passage 36 to the second delivery pipe 40 by the second pump 38. It should be noted that the second injectors 42 are provided as ammonia supply injectors for supplying the ammonia to the combustion chambers 28, and disposed respectively in the cylinders 26 so as to be exposed to the corresponding combustion chambers 28.

In this manner, in this embodiment, the ammonia supply system 30 is designed to inject aqueous urea into the combustion chambers 28. The aqueous urea injected into the combustion Chamber 28 receives the heat in the combustion chamber 28, causing a chemical reaction. As a result, ammonia is produced in the combustion chamber 28. In this manner, the ammonia supply system 30 inject the aqueous urea into the combustion chambers 28, resulting in being capable of supplying the ammonia into the combustion chambers 28.

On the other hand, the exhaust system of the engine 10 includes an exhaust manifold 44 connected to exhaust ports and an exhaust tube 46 connected to the downstream side of the exhaust manifold 44. The exhaust ports, the exhaust manifold 44 and the exhaust tube 46 each define a part of the exhaust passage 48.

In the exhaust passage 48, a first catalyst converter 52, a second catalyst converter 54 and a second ammonia supply system 55 are arranged. The first converter 52 and the second catalyst converter 54 each define a partial section of the exhaust passage 18.

The first catalyst converter 52 and the second catalyst converter 54 are arranged in series in the exhaust passage 48 in that order from the upstream side. In turn, in the first catalyst converter 52, an oxidation catalyst converter 56 for oxidizing unburned components (in particular, HC) in the exhaust gas for purification, and a DPR (Diesel Particulate Reduction) catalyst converter 58 for collecting particulate matter (PM) in the exhaust gas for burning-off and removal are arranged in series in that order from the upstream side. In the second catalyst converter 54, an SCR catalyst converter 60 for reducing NOx in the exhaust gas for purification, and en oxidation catalyst convertor 62 for treating the ammonia which has passed through the SCR catalyst converter 60 are arranged.

A valve 64 is arranged between the first catalyst converter 52 and the second catalyst converter 54, that is, in en exhaust passage 48m downstream of the DPR catalyst converter 58 and upstream of the SCR catalyst converter 60, and is provided for selectively adding aqueous urea as a reducing agent in order to allow the addition of ammonia to the SCR catalyst converter 60. The aqueous urea is injected into the exhaust passage 48 from the valve 64 toward the SCR catalyst converter 60 at the downstream side. The valve 64 is connected to the aqueous-urea tank 32 storing aqueous urea, via an aqueous-urea supply tube 66 defining an aqueous-urea supply passage 65 in order to supply the aqueous urea to the valve 64. A third pump 68 is provided for sending the aqueous urea from the aqueous-urea tank 32 toward the valve 64. In the embodiment, the second ammonia supply system 55 is configured by including the valve 64, the aqueous-urea supply tube 66, the aqueous-urea tank 32 and the third pump 68.

It should be noted that the first catalyst converter 52 and the second catalyst converter 54 may be integrated with each other. The ammonia supply system 30 and the second ammonia supply system 55 may be equipped respectively with different aqueous-urea tanks.

The SCR catalyst in the SCR catalyst converter 60 in this embodiment is formed of a zeolite having Si, O and Al as main ingredients and including ions of Fe. When the SCR catalyst has a temperature within a specific temperature range, aqueous urea is added from the second ammonia supply system 55 toward the SCR catalyst. The aqueous urea is hydrolyzed and thermally decomposed by the heat in the exhaust passage 48. As a result, ammonia is produced. That is, by adding the aqueous urea toward the SCR catalyst, ammonia is supplied onto the SCR catalyst. The ammonia reacts with NOx on the SCR catalyst to reduce the NOx. It should be noted that the SCR catalyst may be a vanadium catalyst ($V_2O_5$). Various SCR catalysts are permissible in the present invention. It should be noted that the SCR catalyst may be provided on a carrier, for example, an alumina substrate. In this embodiment, the SCR catalyst converter 60 has a carrier and a SCR catalyst supported on the carrier.

The DPR catalyst converter 58, which is a type of DPF (Diesel Particulate Filter), has a filter structure and precious metals supported on the surface of the filter structure. That is, the DPR catalyst converter 58 can use a catalytic action of the precious metals to continuously oxidize (burn) the particulate matter (PM) trapped by the filter.

In this embodiment, the oxidation catalyst converter 56 and the oxidation catalyst converter 62 have the same structure. The oxidation catalyst converters 56, 62 each have a honeycomb construction and precious metals such as platinum (Pt) or the like supported by the honeycomb construction. The oxidation catalyst converter 56 and the oxidation catalyst converter 62 each may have a structure different from such a structure or may differ in structure from each other. The oxidation catalyst converter 62 is provided for oxidizing and purifying the ammonia leaking from the SCR catalyst converter 60 as described earlier.

It should be noted that both the oxidation catalyst converter 56 and the DPR catalyst converter 58 do not include any catalyst component promoting a chemical reaction of nitrogen oxides including NO and $NO_2$. However, the oxidation catalyst converter 56 and the DPR catalyst converter 58 may include such a catalyst component.

As described above, the SCR catalyst converter 60 and the second ammonia supply system 55 are provided in the exhaust passage 48. The SCR catalyst converter 60 and the second ammonia supply system 55 are included in a NOx purification system 50 included in the exhaust purification device 1.

An electronic control unit (ECU) 70 is provided as control means for performing the control of the entire engine 10 equipped with the exhaust purification device 1 including the first ammonia supply system 30 and the NOx purification system 50. The ECU 70 includes a CPU, a ROM, a RAM, an input port, an output port, a memory device, and the like. The ECU 70 controls the first pump 20, the first injectors 24 and the like on the basis of detection values obtained using various sensors and the like in order to perform desired engine control. In addition, the ECU 70 controls the second pump 38, the second injectors 42, the valve 64, the third pump 68 and the like in order to perform desired exhaust purification control. In this manner, the ECU 70 has a function as a control device for controlling the second injectors 42 as the ammonia supply injectors.

The sensors connected to the ECU 70 include a rotation speed sensor 72 for detecting a rotation speed of the engine 10, a load sensor 74 for detecting a load on the engine 10, an exhaust temperature sensor 76 for detecting a temperature of the exhaust gas, a NOx sensor 78 for detecting a concentration of NOx in the exhaust gas, and a pressure sensor 80 for detecting a temperature in the combustion chamber 28. The rotation speed sensor 72 may be a crank angle sensor for detecting a crank angle of the engine 10. The load sensor 74 may be an air flow meter provided in the intake system or an accelerator opening sensor. In the embodiment, the exhaust temperature sensor 76 is arranged in the exhaust passage 48*d* downstream of the second catalyst converter 54. The NOx sensor 78 is arranged in the exhaust passage 48*d* downstream of the second catalyst converter 54. However, the numbers and the installation positions of exhaust temperature sensors 76 and the numbers and the installation positions of NOx sensors 78 may be variously changed. For example, the NOx sensors may be arranged upstream of the SCR catalyst converter 60, and downstream of the SCR catalyst converter 60. The pressure sensor 80 is a pressure sensor for detecting a pressure in each of the cylinders 26. In the embodiment, the pressure sensor 80 is arranged such that a pressure-receiving face is exposed to the corresponding combustion chamber. In the embodiment, the pressure sensor 80 is included in the temperature detection means for detecting a temperature in the combustion chamber, but may be replaced by a temperature sensor.

Figure 5:
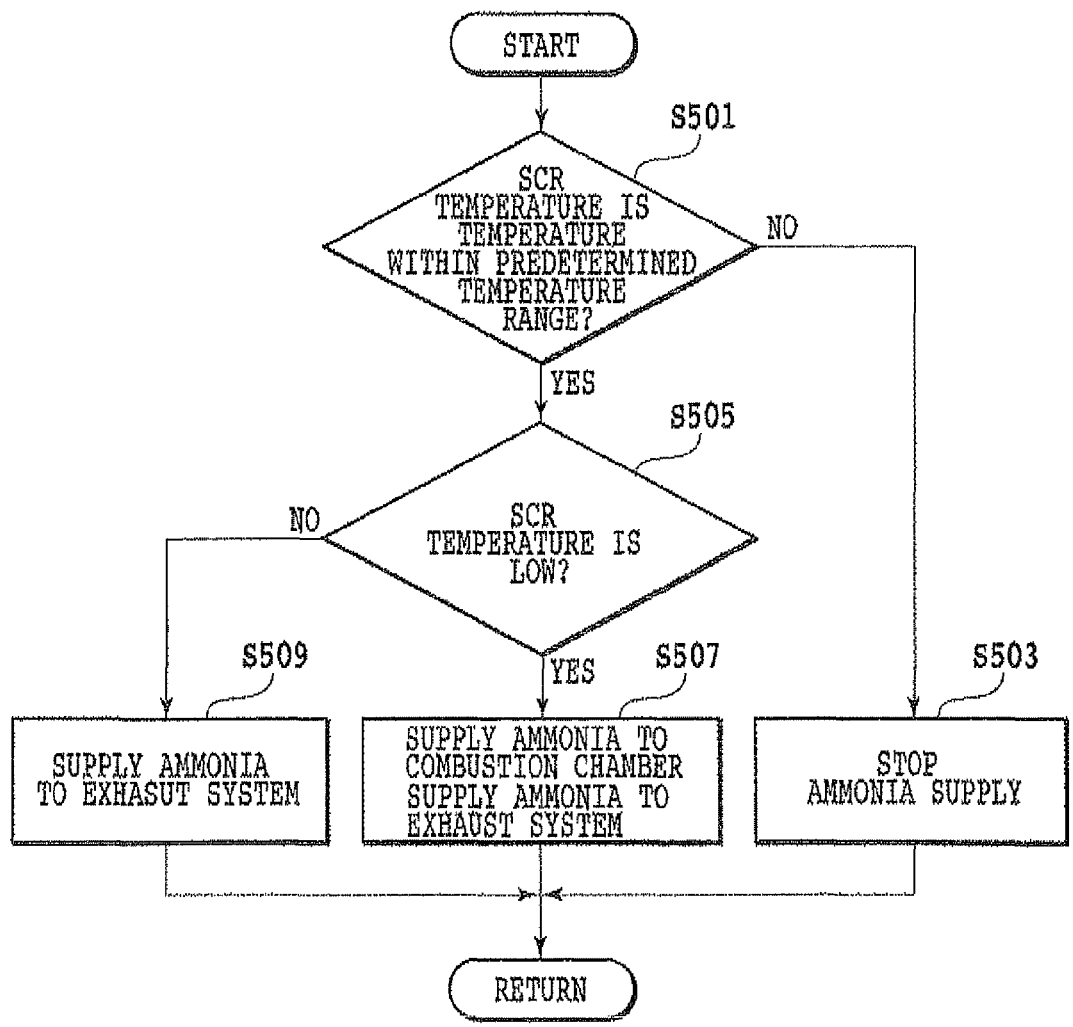
FIG. 5 is a flowchart relating to the embodiment.

Addition of aqueous urea in the ammonia supply system 30 and the second ammonia supply system 55 will be described with reference to the flow chart in FIG. 5. In this regard, the flow in FIG. 5 is repeated every predetermined time.

As described below in detail, the addition of the aqueous urea from the ammonia supply system 30 is controlled on the basis of a temperature of the SCR catalyst in the SCR catalyst converter 60 and a temperature in the combustion chamber 28. The addition of the aqueous urea from the second ammonia supply system 55 is controlled on the basis of a temperature of the SCR catalyst in the SCR catalyst converter 60.

Upon the operation of the engine 10, initially, step S501 is performed. It is determined in step S501 whether or not the temperature in the SCR catalyst converter 60, that is, the temperature (SCR temperature) of the SCR catalyst stored in the SCR catalyst convertor 60 is a temperature within a predetermined temperature range. The SCR temperature in detected by estimations herein. Specifically, the ECU 70 estimates a SCR temperature by retrieving data which is predetermined by experiments and stored, on the basis of an exhaust temperature detected based on a signal output from the exhaust temperature sensor 76. It should be noted that the method of estimating the SCR temperature is not limited to such an example. The SCR temperature may be directly detected by the use of a temperature sensor embedded in the SCR catalyst converter 60. Instead, the SCR temperature may be estimated on the basis of an operation state determined based on an output signal from the rotation speed sensor 72 and the load sensor 74. The predetermined temperature range used as criteria for evaluation in stop S501 is defined for determination whether or not the SCR catalyst is in a state of being capable of fulfilling the function of purifying NOx. That is, when the SCR temperature is a temperature within the predetermined temperature range, the SCR catalyst can be considered to be in an active state. For this reason, the predetermined temperature range in step S501 is an active temperature range of the SCR catalyst. Specifically, the predetermined temperature range is a temperature range of 150° C. or higher. In the embodiment the upper limit temperature of the predetermined temperature range is not prescribed, but may be prescribed. For example, the predetermined temperature range may be set to be a temperature range of 180° C. or higher, or a temperature range between 150° C. or higher and 600° C. or lower, or a temperature range between 180° C. or higher and 600° C. or lower.

When a negative determination is made at step S501 because the SCR temperature is not a temperature within the predetermined temperature range, the addition of the aqueous urea is stopped at step S503 so as to stop the supply of the ammonia. As a result, the addition of the aqueous urea in the ammonia supply system 30 and the addition of the aqueous urea in the second ammonia supply system 55 are both stopped. Thus, the routine is terminated.

On the other hand, when a positive determination is made at step S501 because the SCR temperature is a temperature within the predetermined temperature range, step S505 is performed. It is determined at step S505 whether or not the SCR temperature is low. Specifically, it is determined whether or not the SCR temperature is equal to or lower than the predetermined temperature. In the embodiment the predetermined temperature at step S505 is set at 300° C., but it may be set at another temperature. This determination is made for determining whether or not NOx purification can be sufficiently achieved by a catalytic action of the SCR catalyst in the SCR catalyst converter 60 alone. In this stage, as to the SCR temperature, the SCR temperature obtained in step S501 is used. However, the SCR temperature may be newly detected in step S505.

When a positive determination is made at step S505 because the SCR temperature is equal to or lower than a predetermined temperature, step S507 is performed. In step S507, the addition of the aqueous urea in the ammonia supply system 30 and the addition of the aqueous urea in the second ammonia supply system 55 are both made such that the ammonia is supplied toward the combustion chambers 28 and the SCR catalyst. It should be noted that step S507 is followed by the termination of the routine.

The amount of the addition and the timing of the addition of the aqueous urea in the ammonia supply system 30 are set on the basis of data predetermined based on experiments such that NO and $NO_2$ in the exhaust gas which will enter the SCR catalyst converter 60 become equal in ratio ($NO:NO_2$ 1:1). However, for retrieving the data, at least one of the fuel injection amount, the rotation speed, the load, the temperature in the combustion chamber, the exhaust temperature, the SCR temperature and the NOx concentration in the exhaust gas may be used. In this embodiment, the temperature in the combustion chamber, the SCR temperature and the NOx concentration are used. In particular, in this embodiment, based on the exhaust temperature detected based on a signal output from the exhaust temperature sensor 76, that is, the SCR temperature in the embodiment, and on the NOx concentration detected based on a signal output from the NOx sensor 78, a ratio between NO and $NO_2$ in the exhaust gas which will enter the SCR catalyst converter 60 is estimated. Then, based on the estimated ratio, the amount of the addition and the timing of the addition of the aqueous urea in the ammonia supply system 30 may be determined at each time as needed.

Figure 6:
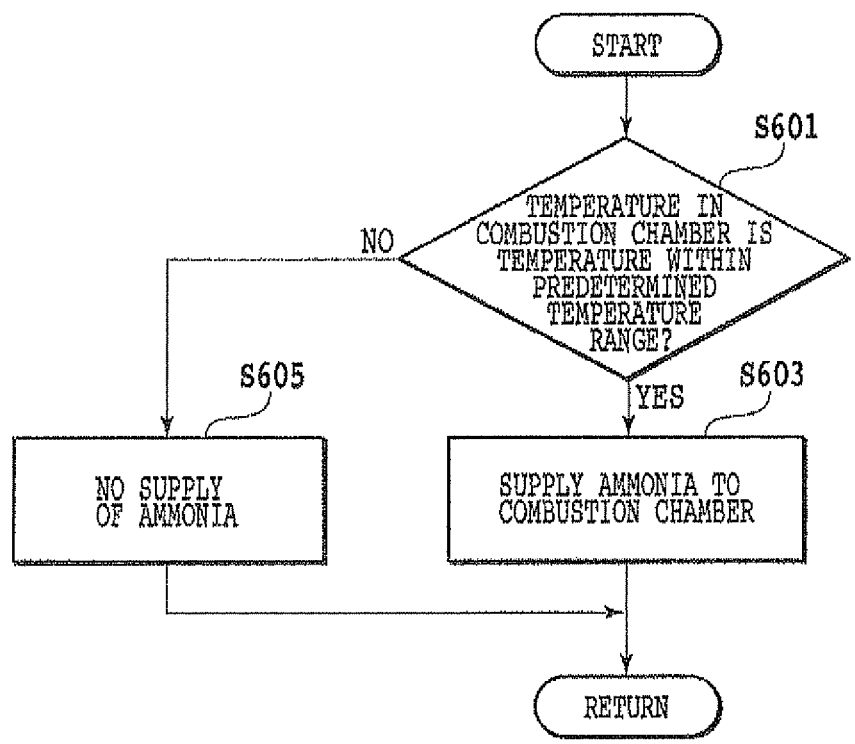
FIG. 6 is a flowchart relating to the timing for supplying ammonia into a combustion chamber.

Then, in particular, the timing of the addition of the aqueous urea in the ammonia supply system 30 is determined when the temperature in the combustion chamber is a temperature within a predetermined temperature range from 1000K (about 727° C.) or higher to 1400K (about 1127° C.) or lower. This aims at appropriately increasing the ratio of $NO_2$ as described above. FIG. 6 briefly shows the flow regarding the timing of the addition. When a positive determination is made at step S601 because the temperature in the combustion chamber 28 is a temperature within the predetermined temperature range, aqueous urea is injected at step S603 so as to supply ammonia. On the other hand, when a negative determination is made at step S601, the addition of the aqueous urea is stopped at step S605 so as to supply no ammonia. Such switching is substantially repeated as long as the flow to step S507 lasts. That is, as long as the flow to stop S507 lasts, the addition of the aqueous urea to the combustion chamber 28 is made once per combustion cycle. It should be noted that when the temperature in the combustion chamber is 1000K or higher and 1400K or lower, this is included in a period between after the compression top dead center and before opening of the exhaust valve, which may correspond to, for example, the period from 10° to 40° after the compression top dead center. Then, based on these matters, the second injectors 42 are controlled.

The amount of the addition and the timing of the addition of the aqueous urea in the second ammonia supply system 55 are controlled on the basis of the NOx concentration (or the amount of NOx associated with the NOx concentration) in the exhaust gas detected based on an output signal from the NOx sensor 78. Specifically, by retrieving data which is predetermined based on experiments and stored, based on the NOx concentration, the amount at the addition and the timing of the addition of the aqueous urea are defined. Based on those matters, the valve 64 is controlled so that the NOx purification is appropriately performed in the SCR catalyst converter 60 and ammonia does not leak from the SCR catalyst converter 60, in other words, the ammonia slip does not occur. The addition of the aqueous urea from the valve 64 can be continuously or intermittently made.

It should be noted that the addition of the aqueous urea from the second injectors in the ammonia supply system 30 and the addition of the aqueous urea from the valve 64 in the second ammonia supply system 55 may be correlated with each other for the controlling.

On the other hand, when a negative determination is made at step S505 because the SCR temperature is not equal to or lower than the predetermined temperature, step S509 is performed. In step S509, the addition of the aqueous urea in the ammonia supply system 30 is stopped and the addition of the aqueous urea in the second ammonia supply system 55 alone is performed, so that ammonia is supplied to only the exhaust system. It should be noted that, since the addition of the aqueous urea in the second ammonia supply system 55 is made substantially as described in step S507, the description here is omitted. Step S509 is followed by the termination of the routine.

As described above, when the SCR temperature is a temperature within the predetermined temperature range, ammonia is supplied to the SCR catalyst to purify NOx in the SCR catalyst converter 60. Then, since the SCR temperature is low, when the capability of NOx purification in the SCR catalyst converter 60 is low, ammonia is supplied to the combustion chamber. This makes it possible to increase the ratio of $NO_2$ in the exhaust gas emitted from the combustion chamber into the exhaust passage. As a result, the NOx purification in the SCR catalyst converter 60 can be promoted.

The present invention has been described above on the basis of the embodiment, but the present invention permits various changes. For example, since the engine 10 is a four-cylinder engine, the pressure sensor 80 is mounted for each cylinder 26. That is, the temperature in the combustion chamber 28 is detected for each cylinder 26, so that the ammonia can be supplied to the combustion chamber as described above. This is effective particularly in the engine equipped with the EGR device. This is because variations in distribution of EGR gas occur between the cylinders. However, when such variations between the cylinders do not occur, the temperature in one specific combustion chamber may be used to control the supply of the ammonia to the other combustion chambers.

In the above-mentioned embodiment, when the SCR temperature is a temperature within the predetermined temperature range but the temperature is low, the ammonia is supplied to the combustion chamber 28. However, even when the SCR temperature is not low, the ammonia may be supplied to the combustion chamber 28. In addition, the substance supplied from the ammonia supply system 30 may differ from the substance supplied from the second ammonia supply system 55. For example, a substance supplied from any one of the systems may be ammonia and a substance supplied from the other system may be aqueous urea.

The present invention can be applied to engines other than the compression ignition engine, and can be applied to, for example, a spark ignition engine. The present invention can be applied to internal combustion engines having various types, various numbers of cylinders, and various types of cylinder arrangements.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An exhaust purification device for an engine, comprising:
   an ammonia supply system including an ammonia supply injector for supplying ammonia or a substance producing ammonia to a combustion chamber, and a control unit for controlling the ammonia supply injector; and
   an NOx purification system for purifying NOx included in an exhaust gas, the NOx purification system including a selective catalytic reduction catalyst fulfilling a function for purifying NOx under the presence of ammonia, and an exhaust-system ammonia supply system supplying ammonia or a substance producing ammonia to an exhaust passage upstream of an exhaust passage section in which the selective catalytic reduction catalyst is arranged, wherein
   the ammonia supply system supplies the ammonia or the substance producing the ammonia to the combustion chamber in such a manner that a ratio between an NO component and an $NO_2$ component in the exhaust gas arriving at the exhaust passage section in which the selective catalytic reduction catalyst is arranged is made to a required ratio, during a period set according to the required ratio.

2. The exhaust purification device for the engine according to claim 1, wherein
   the control unit controls the ammonia supply injector to supply the ammonia or the substance producing the ammonia to the combustion chamber when a temperature in the combustion chamber is a temperature within a first predetermined temperature range.

3. The exhaust purification device for the engine according to claim 2, wherein
the ammonia supply system supplies the ammonia or the substance producing the ammonia to the combustion chamber when a temperature in the combustion chamber is within the first predetermined temperature range in such a manner as to increase a ratio of $NO_2$ in the exhaust gas emitted from the combustion chamber to the exhaust passage by the supply of the ammonia or the substance producing the ammonia to the combustion chamber.

4. The exhaust purification device for the engine according to claim 2, wherein
the first predetermined temperature range is a temperature range from 1000K to 1400 K inclusive.

5. The exhaust purification device for the engine according to claim 2, wherein
the ammonia supply system includes a temperature detector for detecting a temperature in the combustion chamber.

6. The exhaust purification device for the engine according to claim 5, wherein
the temperature detector includes a sensor for detecting a pressure in the combustion chamber.

7. The exhaust purification device for the engine according to claim 2, wherein
the control unit controls the ammonia supply injector to supply the ammonia or the substance producing the ammonia to the combustion chamber when a temperature of the selective catalytic reduction catalyst is a temperature within a second predetermined temperature range.

8. The exhaust purification device for the engine according to claim 7, wherein
the second predetermined temperature range is a temperature range from 150° C. to 300° C. inclusive.

9. The exhaust purification device for the engine according to claim 1, wherein
the control unit controls injection from the ammonia supply injector in such a manner that the ratio between the NO component and the $NO_2$ component in the exhaust gas arriving at the exhaust passage section in which the selective catalytic reduction catalyst is arranged is made to 1:1.

10. The exhaust purification device for the engine according to claim 1, further comprising
at least one of a downstream temperature detector for detecting a temperature in an exhaust passage downstream of the exhaust passage section in which the selective catalytic reduction catalyst is arranged, and an NOx detector for detecting a NOx concentration in the exhaust passage downstream of the exhaust passage section in which the selective catalytic reduction catalyst is arranged, wherein
the control unit controls injection from the ammonia supply injector by using at least one of the downstream temperature detector and the NOx detector.

11. The exhaust purification device for the engine according to claim 1, wherein
a catalyst including no catalyst component promoting a reaction of nitrogen oxides including NO and $NO_2$ is arranged in an exhaust passage upstream of the exhaust passage section in which the selective catalytic reduction catalyst is arranged.

12. The exhaust purification device for the engine according to claim 1, wherein
the ammonia supply system and the NOx purification system share a common tank for storing ammonia.

13. The exhaust purification device for the engine according to claim 1, wherein
the ammonia supply system and the NOx purification system share a common tank for storing aqueous urea.

14. An engine, comprising the exhaust purification device for the engine according to claim 1.

15. An exhaust purification method for an engine in the exhaust purification device for the engine according to claim 1, comprising:
a step of determining whether or not a temperature of the selective catalytic reduction catalyst is within an active temperature range of the selective catalytic reduction catalyst; and
a step of, when it is determined by the step that the temperature of the selective catalytic reduction catalyst is within the active temperature range, supplying ammonia to the combustion chamber by the ammonia supply system when a temperature in the combustion chamber is a temperature within a predetermined temperature range.

* * * * *